(12) United States Patent
Sunakawa

(10) Patent No.: US 8,839,305 B2
(45) Date of Patent: Sep. 16, 2014

(54) CONTENT NOTIFICATION METHOD AND APPARATUS, CONTENT PROCESSING METHOD AND APPARATUS, AND STORAGE MEDIUM STORING PROGRAM FOR EXECUTING THE METHOD

(75) Inventor: Shinichi Sunakawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1211 days.

(21) Appl. No.: 11/762,356

(22) Filed: Jun. 13, 2007

(65) Prior Publication Data

US 2008/0005769 A1 Jan. 3, 2008

(30) Foreign Application Priority Data

Jun. 13, 2006 (JP) .................. 2006-163863

(51) Int. Cl.
| | | |
|---|---|---|
| *G06F 3/00* | (2006.01) | |
| *G06F 13/00* | (2006.01) | |
| *H04N 5/445* | (2011.01) | |
| *H04N 7/18* | (2006.01) | |
| *H04N 21/433* | (2011.01) | |
| *H04N 21/84* | (2011.01) | |
| *H04N 21/482* | (2011.01) | |
| *H04N 7/173* | (2011.01) | |
| *H04N 21/8405* | (2011.01) | |
| *H04N 21/462* | (2011.01) | |
| *H04N 21/442* | (2011.01) | |
| *H04N 21/4788* | (2011.01) | |
| *H04N 21/436* | (2011.01) | |
| *H04N 21/466* | (2011.01) | |
| *H04N 21/25* | (2011.01) | |

(52) U.S. Cl.
CPC ....... *H04N 7/17318* (2013.01); *H04N 21/4331* (2013.01); *H04N 21/84* (2013.01); *H04N 21/482* (2013.01); *H04N 21/8405* (2013.01); *H04N 21/4622* (2013.01); *H04N 21/44222* (2013.01); *H04N 21/4788* (2013.01); *H04N 21/43615* (2013.01); *H04N 21/4826* (2013.01); *H04N 21/4661* (2013.01); *H04N 21/252* (2013.01)
USPC .................................. 725/59; 725/54; 725/78

(58) Field of Classification Search
None
See application file for complete search history.

(56) References Cited

U.S. PATENT DOCUMENTS

| | | | | |
|---|---|---|---|---|
| 5,829,041 | A * | 10/1998 | Okamoto et al. ............. | 711/147 |
| 7,760,383 | B2 * | 7/2010 | Matsuda et al. ............. | 358/1.15 |
| 2001/0039520 | A1 | 11/2001 | Nakade et al. | |
| 2002/0065719 | A1 * | 5/2002 | Yamaguchi ..................... | 705/14 |
| 2002/0107808 | A1 | 8/2002 | Dobbelaar | |
| 2002/0144273 | A1 * | 10/2002 | Reto ............................... | 725/86 |
| 2002/0184634 | A1 * | 12/2002 | Cooper ........................... | 725/51 |
| 2003/0212804 | A1 * | 11/2003 | Hashemi ....................... | 709/228 |
| 2003/0231602 | A1 * | 12/2003 | Slemmer et al. .............. | 370/282 |
| 2004/0231003 | A1 * | 11/2004 | Cooper et al. ................. | 725/135 |
| 2005/0044201 | A1 * | 2/2005 | Suzuki et al. ................. | 709/223 |
| 2005/0066365 | A1 * | 3/2005 | Rambo .......................... | 725/51 |
| 2005/0097623 | A1 * | 5/2005 | Tecot et al. ................... | 725/136 |

(Continued)

FOREIGN PATENT DOCUMENTS

JP 2003-284008 A 10/2003

*Primary Examiner* — Brian T Pendleton
*Assistant Examiner* — Jonathan V Lewis
(74) *Attorney, Agent, or Firm* — Rossi, Kimms & McDowell LLP

(57) ABSTRACT

A method of notifying contents, which makes it possible to improve operability in obtaining contents. A content is provided to a first user. A second user who has designated the first user is notified of the detected content.

12 Claims, 9 Drawing Sheets

(56) References Cited

U.S. PATENT DOCUMENTS

| | | | |
|---|---|---|---|
| 2005/0141542 A1* | 6/2005 | Handekyn et al. | 370/437 |
| 2005/0281540 A1* | 12/2005 | Inokuchi et al. | 386/94 |
| 2006/0161950 A1* | 7/2006 | Imai et al. | 725/46 |
| 2006/0190974 A1* | 8/2006 | Lee | 725/87 |
| 2006/0224705 A1* | 10/2006 | Takase | 709/220 |
| 2007/0083908 A1* | 4/2007 | McCarthy et al. | 725/112 |
| 2007/0130589 A1* | 6/2007 | Davis et al. | 725/62 |
| 2007/0186242 A1* | 8/2007 | Price et al. | 725/46 |
| 2007/0290876 A1* | 12/2007 | Sato et al. | 340/825.22 |

* cited by examiner

CONTENT NOTIFICATION METHOD AND APPARATUS, CONTENT PROCESSING METHOD AND APPARATUS, AND STORAGE MEDIUM STORING PROGRAM FOR EXECUTING THE METHOD

BACKGROUND OF THE INVENTION

1. Field of the Invention

The present invention relates to a content notification method and apparatus, a content processing method and apparatus, and a storage medium storing a program for executing the method.

2. Description of the Related Art

Conventionally, there have been provided viewing systems that enable users to view contents, such as television programs and movies. For example, a television system is a viewing system that enables users to view broadcast contents, such as television programs, by receiving the same e.g. via broadcast waves or cables. Further, there has also been provided network broadcast in which broadcast contents are transmitted from broadcast stations via networks. Further, there have also been widely used a viewing system which is comprised of a video recording and reproducing apparatus, such as a DVD/HDD (Hard Disk Drive) recorder or a video-cassette recorder, and a display device, such as a television monitor, which are connected to each other so as to enable recorded contents to be viewed.

On the other hand, the number of contents which users can view by making use of the above-described environments has been rapidly increasing, which makes it difficult for users to find out contents which they feel like viewing. Particularly, the number of channels that can be viewed by cable television has reached as many as several hundreds. Further, recently, the capacity of a storage device mounted e.g. on the DVD/HDD recorder has become so large that several hundreds of programs can be recorded thereon. Therefore, it is expected that the number of contents available to users will become even larger along with progress in transmission technology and apparatuses, etc.

For a user to find a desired content from a large number of contents, the following methods are known, for example.

(1) A method of displaying viewable contents in a list: For example, in television broadcasting, an EPG (Electronic Program Guide) is displayed on a television receiver whereby the user can select a television program of a desired channel. Data constituting the EPG is transmitted to the television receiver together with the contents, and is formed into a list on the receiver side for display. On the other hand, the video recording and reproducing apparatus having the function of recording television programs displays a list of recorded contents, whereby each user can select a desired content therefrom. Under such environments, data obtained from the EPG, time stamps indicative of times of recording, data input by the user, and so forth are used as identification tags of contents.

(2) A method of a user inputting a keyword to search for and display contents matching the keyword: This method searches the EPG and the list of recorded contents.

(3) A method of collecting and compiling viewing information via a network to thereby provide the viewing information to the user in real time: In this method, real-time viewing information is collected and compiled, and the results of compiling the viewing information are transmitted to a user side terminal for selection of contents (see e.g. Japanese Laid-Open Paten Publication (Kokai) No. 2003-284008).

On the other hand, as a method of a content supply side user showing advertisements to users, it has been proposed to superimpose an advertisement of selling goods selected by a transmitting user on live video images for distribution of the resulting video images to receiving users at the other ends of communication, and enable any receiving user to connect to a system of a business enterprise dealing with the goods when the receiving user clicks on the video images (see e.g. US Patent Application No. 20010039520) In this method, when the transmitting user sets the live video images to be permitted to be used as an advertisement medium and selects selling goods to be advertised, an image superimposing process is carried out e.g. for superimposing images of the goods on the live video images i.e. contents.

However, when a user wants to find a desired content from a large number of contents, the above-described methods (1) to (3) require the user to switch channels after termination of the program being viewed. This switching operation is troublesome for the user.

Further, under an environment in which a user views television programs while carrying out work, the user is required to judge contents of television programs and switch channels after termination of the program being viewed. This is troublesome for the user.

SUMMARY OF THE INVENTION

The present invention provides a content notification method and apparatus, a content processing method and apparatus, and a storage medium storing a program for executing the method, which make it possible to improve operability in obtaining contents.

In a first aspect of the present invention, there is provided a method of notifying a content, comprising a detection step of detecting a content provided to a first user, and a notification step of notifying the detected content to a second user who has designated the first user.

In a second aspect of the present invention, there is provided a content notification apparatus, comprising a detection unit configured to detect a content provided to a first user, and a notification unit configured to notify the detected content to a second user who has designated the first user.

In a third aspect of the present invention, there is provided a content processing apparatus, comprising a designation unit configured to designate a user, a notification unit configured to notify the designated user to a management device, a receiving unit configured to receive identification information on a content associated with the designated user from the management device to which the designated user was notified, and a processing unit configured to process the content associated with the designated user.

In a fourth aspect of the present invention, there is provided a method of processing a content, comprising an input step of making an input designating a user, a notification step of notifying the designated user to a management device, a receiving step of receiving identification information on a content associated with the designated user from the management device to which the designated user was notified, and a processing step of processing the content associated with the designated user.

In a fifth aspect of the present invention, there is provided a storage medium in which a program for causing a computer to execute a method of processing a content is stored, wherein the method comprising an input step of making an input designating a user, a notification step of notifying the designated user to a management device, a receiving step of receiving identification information on a content associated with the designated user from the management device to which the designated user was notified, and a processing step of processing the content associated with the designated user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DETAILED DESCRIPTION OF THE PREFERRED EMBODIMENTS

The present invention will now be described in detail with reference to the drawings showing preferred embodiments thereof.

Figure 1:
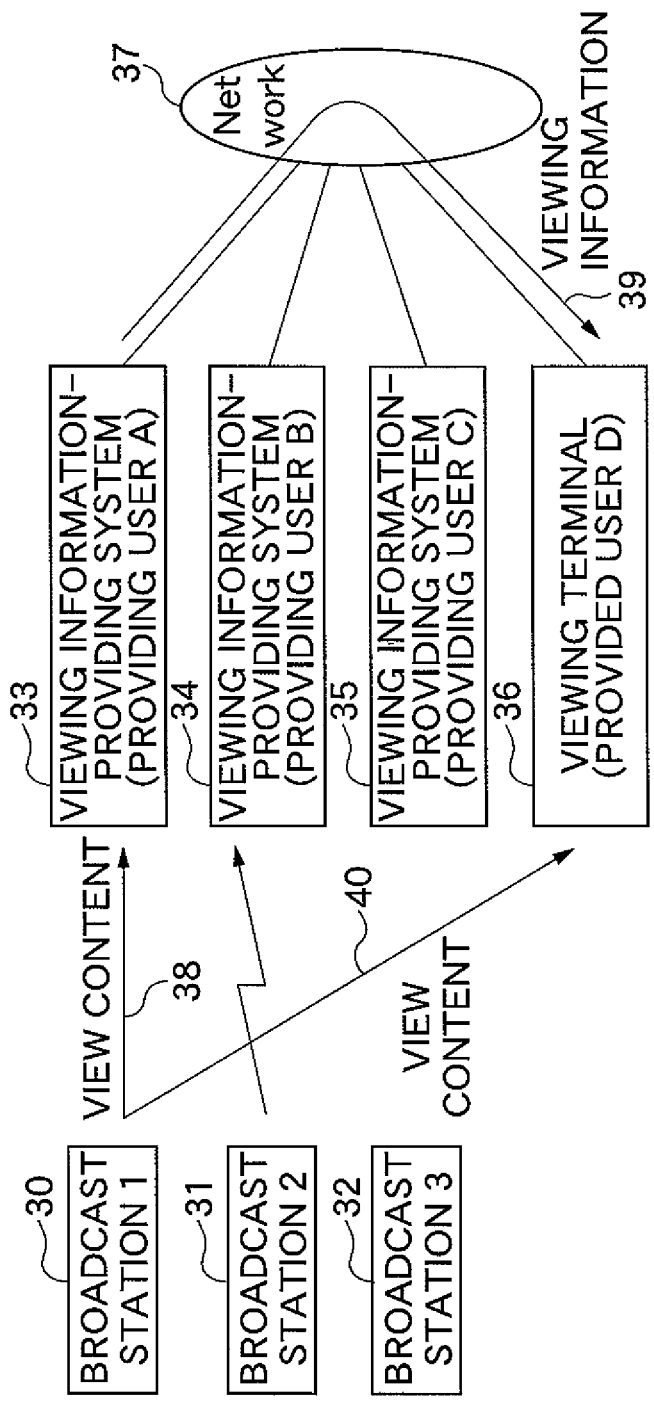
FIG. 1 is a diagram of a viewing system according to a first embodiment of the present invention.

FIG. 1 is a diagram of a viewing and listening system (hereinafter simply referred to as "the viewing system") in its entirety according to a first embodiment of the present invention.

In FIG. 1, reference numerals 30, 31, and 32 designate broadcast stations that perform distribution of contents e.g. by radio or television broadcasting. Although FIG. 1 shows a viewing system comprised of three broadcast stations, i.e. broadcast stations 1, 2, and 3, the number of the broadcast stations is not limited to three. The broadcasting method of the broadcast stations 1, 2, and 3 is not limited to digital/analog broadcast or terrestrial/satellite/cable/network broadcast, but it may be a desired broadcasting system.

Reference numerals 33, 34, and 35 designate viewing and listening information (hereinafter simply referred to as "viewing information)-providing systems, which form viewing environments used by users A, B, and C who provide viewing information (hereinafter referred to as "the providing users A, B, and C"). The providing users A, B, and C are allowed to use the viewing information-providing systems 33 to 35, and view contents distributed e.g. by the broadcast stations 1 to 3.

Reference numeral 36 designates a viewing and listening terminal (hereinafter simply referred to as "the viewing terminal) used by a user D who is provided with viewing information (hereinafter referred to as "the provided user D"). The provided user D is capable of using the viewing terminal 36 and viewing contents distributed by the broadcast stations 1 to 3, similarly to the viewing information-providing systems 33 to 35. Reference numeral 37 designates a network, such as the Internet or a LAN (Local Area Network), and connects the viewing information-providing systems 33 to 35 and the viewing terminal 36 to each other. Viewing information is requested and transmitted on the network 37.

Next, an example of the operation of the viewing system will be described.

The providing user A views contents distributed from the broadcast station 1 using the viewing information-providing system 33 (flow 38). Now, when the provided user D designates the providing user A on the viewing terminal 36, viewing information indicative of the viewing conditions of the providing user A is provided from the viewing information-providing system 33 to the viewing terminal 36 of the provided user D via the network 37 (flow 39). The viewing information includes channel selection information and content information. The channel selection information is e.g. information on a channel selected by the user, and the content information is e.g. information on the start and end times and the title of a television program.

The viewing terminal 36 automatically switches contents based on provided viewing information so as to cause the provided user D to view the same contents as contents that the providing user A is viewing. As a result, the provided user D as well can view the contents distributed from the broadcast station 1 (flow 40).

Next, an example of the configuration of the viewing terminal 36 used by the provided user D will be described with reference to FIG. 2.

Figure 2:
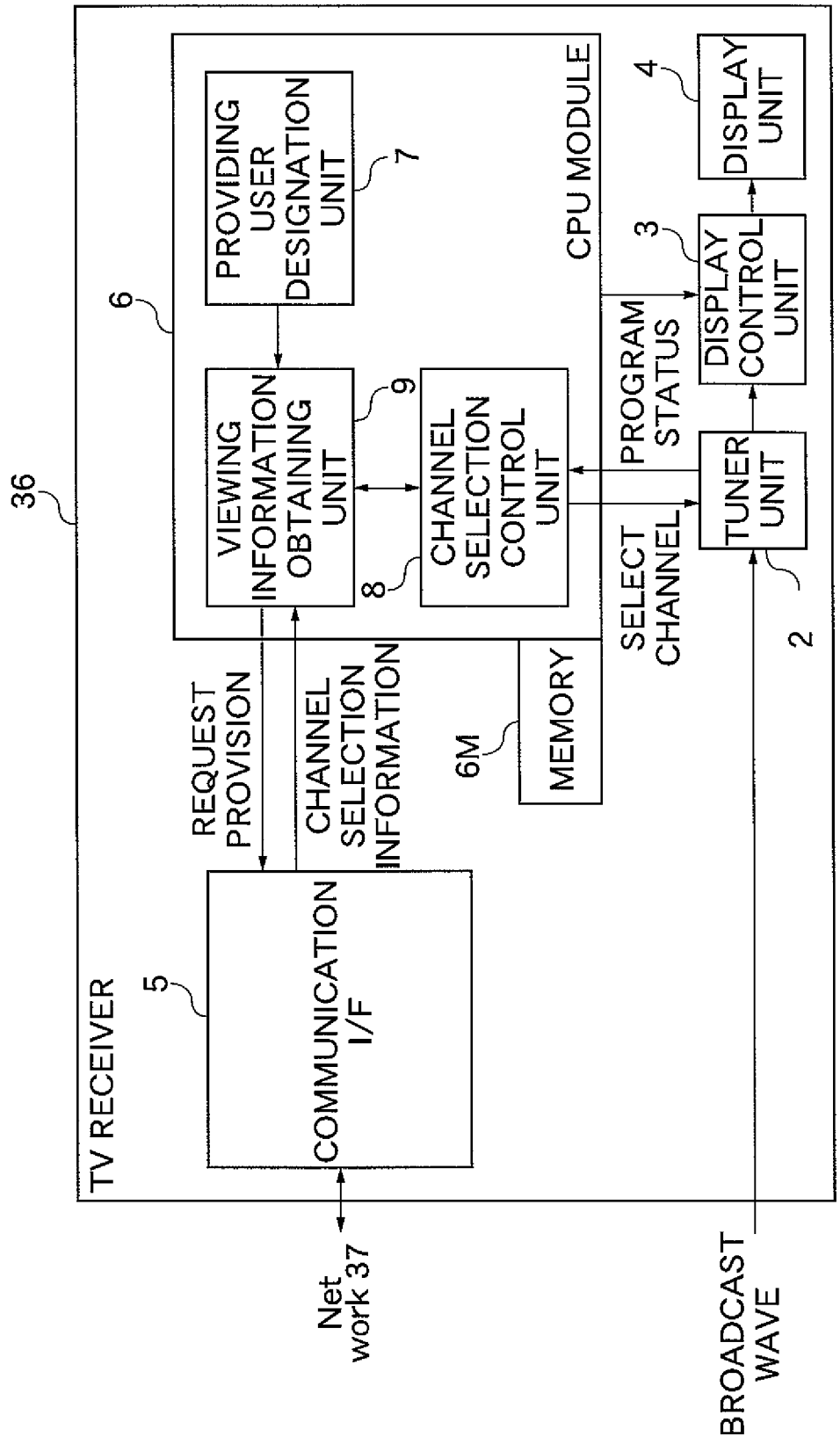
FIG. 2 is a block diagram of a television receiver as an example of a viewing terminal appearing in FIG. 1.

FIG. 2 is a block diagram of a television receiver as an example of the viewing terminal 36 appearing in FIG. 1.

In FIG. 2, the viewing terminal 36 is formed by a television receiver which is capable of receiving television broadcast, as broadcast contents, from broadcast stations, and displaying television programs. Reference numeral 2 designates a tuner unit, which receives a broadcast wave from a broadcast station, and outputs video images of a television program of a selected channel. Reference numeral 3 designates a display control unit which is connected to the tuner unit 2 and a display unit 4, for controlling the display unit 4 to cause the display unit 4 to display the video images output from the tuner unit 2. The display unit 4 comprises a display panel. Examples of the display panel include a CRT (Cathode Ray Tube), an LCD (Liquid Crystal Display), a plasma display, a projection display, an SED (Surface-conduction Electron-emitter Display), and so forth, but the display panel is not limited to these.

Reference numeral 5 designates a communication interface (I/F) which is connected to the network 37, for communicating with the viewing information-providing systems 33 to 35 via the network 37. It should be noted that the network 37 to which the communication interface 5 is connected is not limited to a wired network, but it may be a radio network. Further, the viewing terminal 36 includes an input panel, not shown, and a remote control interface, not shown, which the provided user D uses to perform an inputting operation.

Reference numeral 6 designates a CPU module which is comprised of a CPU, not shown, a memory 6M, various control modules and interfaces, none of which are shown, and is connected to the tuner unit 2, the display control unit 3, and the communication interface 5. The CPU module 6 performs various operations for controlling the inside of the viewing terminal by executing control programs stored e.g. in the memory 6M.

Reference numerals 7, 8, and 9 designate software modules which operate on the CPU. Reference numeral 7 designates a providing user designation unit for performing an input operation to designate and set a providing user. Reference numeral 9 designates a viewing information-obtaining unit for requesting provision of viewing information of the providing user designated by the providing user designation unit 7, and controls reception of channel selection information. Reference numeral 8 designates a channel selection control unit for controlling the tuner unit 2 for switching channels based on the results of reception of channel selection information by the viewing information-obtaining unit 9. Further, when there has occurred a change in status, such as the termination of a program or the interruption of a commercial, the channel selection control unit 8 detects the change in status. This is a necessary function for analyzing data broadcast and the like distributed together with contents. It should be noted that the channel selection control unit 8 can switch channels by accepting the selection of a channel manually instructed by the provided user D.

Next, the configuration of the viewing information-providing system 33, as one of the viewing information-providing systems 33 to 35 appearing FIG. 1, will be described with reference to FIG. 3, by way of example. It should be noted that although in the present embodiment, the viewing information-providing system 33 is described assuming that the viewing information-providing systems 33 to 35 have the same configuration, this is not limitative, but they may have different configurations from each other.

Figure 3:
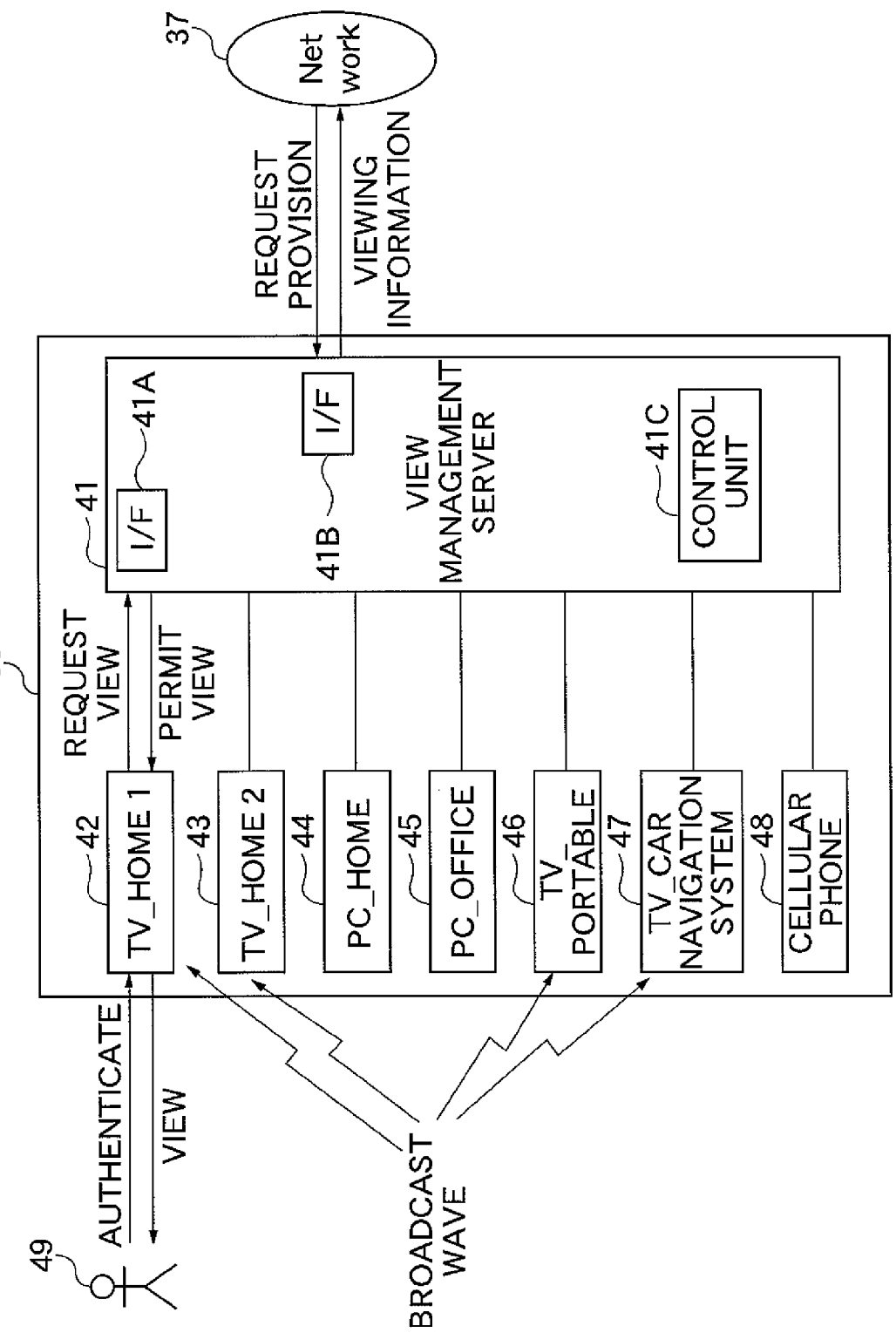
FIG. 3 is a block diagram of an example of a viewing information-providing system appearing in FIG. 1.

FIG. 3 is a block diagram of the viewing information-providing system 33 appearing in FIG. 1.

In FIG. 3, reference numeral 41 designates a view management server which is connected to the network 37. Reference numeral 41B designates an interface for connection between the view management server 41 and the network 37. Reference numeral 41C designates a control unit that performs the following control processes executed by the view management server 41. The view management server 41 registers and manages the access right of a providing user (e.g. a providing user A49) to contents and the viewing information of the providing user. The viewing information of the providing user is registered in the view management server 41, and is provided in response to a request from a provided user. Although in the present embodiment, the view management server 41 is provided for each providing user (each viewing information-providing system), the view management server may be configured to be shared by a plurality of providing users.

Reference numerals 42, 43, 44, 45, 46, 47, and 48 designate viewing terminals, which are used by the providing user A49 for viewing broadcast contents (e.g. television programs). Reference numeral 42 designates a first television receiver (TV_home 1) which is disposed in a home of the providing user A49, for displaying television programs after executing personal authentication of the providing user. Reference numeral 43 designates a second television receiver (TV_home 2) which is disposed in the home of the providing user A49. Reference numeral 44 designates a personal computer (PC_home) disposed in the home of the providing user A49. Reference numeral 45 designates a personal computer (PC_office) disposed in a company for which the providing user A49 works. Reference numeral 46 designates a portable television receiver (TV_portable) owned by the providing user A49. Reference numeral 47 designates a television receiver (TV_car navigation system) disposed in a vehicle owned by the providing user A49. Reference numeral 48 designates a cellular phone owned by the providing user A49. Reference numeral 41A designates an interface for connection between the viewing terminals 42 to 48 and the view management server 41. It should be noted that although the viewing information-providing system 33 is equipped with a plurality kinds of viewing terminals 42 to 48 as shown in FIG. 3, the number and kinds of the viewing terminals are not limited to the above.

For example, when the providing user A49 views a television program using the viewing terminal 42, first, the viewing terminal 42 performs personal authentication of the providing user A49. After the personal authentication, the viewing terminal 42 accepts a channel selection instruction given by the providing user A49. Then, the viewing terminal 42 inquires of the view management server 41 whether or not the providing user A49 has a right to view television programs of a channel the selection of which has been instructed by the providing user A49 according to the channel selection instruction from the providing user A49, as a view request.

Upon reception of the view request, the view management server 41 confirms whether or not the providing user A49 has the right to view television programs of the selected channel, and when the providing user A49 has the right, the view management server 41 sends view permission to the viewing terminal 42. Upon reception of the view permission, the viewing terminal 42 starts to display video images of a television program of the selected channel.

Further, the view management server 41 registers viewing information on a television program that the providing user A49 is currently viewing on the viewing terminal 42. When provision of the viewing information of the providing user A49 is requested by the viewing terminal 36 of the provided user D, the view management server 41 transmits the registered viewing information to the viewing terminal 36 via the network 37. Further, when the providing user A49 views a television program using another viewing terminal (one of the viewing terminals 43 to 48), the view management server 41 performs the above-described operation again. Thus, the viewing information registered in the view management server 41 indicates a television program that the providing user A49 is currently viewing.

Next, an example of the configuration of the viewing terminal 42 used by the providing user A49 will be described with reference to FIG. 4.

Figure 4:
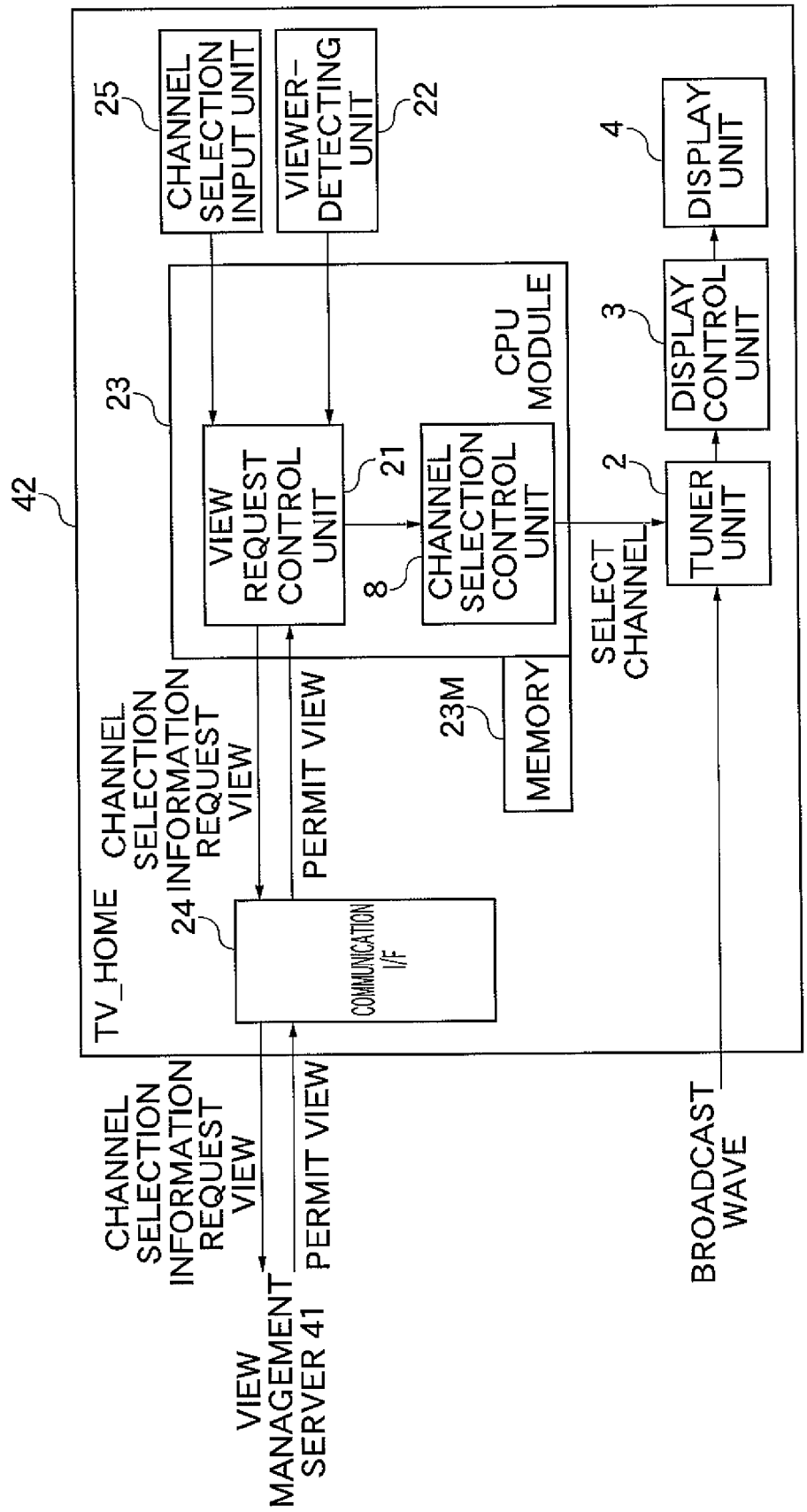
FIG. 4 is a block diagram of a television receiver as one example of a viewing terminal appearing in FIG. 3.

FIG. 4 is a block diagram of a television receiver as an example of the viewing terminal 42. It should be noted that in FIG. 4, component elements identical to those of the viewing terminal 36 shown in FIG. 2 are designated by identical reference numerals.

In FIG. 4, reference numeral 2 designates a tuner unit, reference numeral 3 a display control unit, and reference numeral 4 a display unit. Reference numeral 24 designates a communication interface connected to the view management server 41 for communication with the same. The method of communication by the communication interface 24 is neither limited to wired networks or radio networks, but may be an arbitrary methods including one-to-one connection. Reference numeral 22 designates a viewer-detecting unit which performs personal authentication by an arbitrary authentication method, e.g. password input, fingerprint authentication, voiceprint authentication, or face image recognition. The viewer-detecting unit 22 identifies a providing user who views the viewing terminal 42, and permits only an authenticated providing user to view programs by the viewing terminal 42.

Reference numeral 23 designates a CPU module which is comprised of a CPU, not shown, a memory 23M, and various control modules and interfaces, none of which are shown, and is connected to the tuner unit 2 and the communication interface 24. The CPU module 23 performs various operations for controlling the inside of the viewing terminal by executing control programs stored e.g. in the memory 23M.

Reference numeral 21 designates a view request control unit which is formed by a software module operating on the CPU. As described above, the view request control unit 21 inquires of the view management server 41 via the communication interface 24 whether or not the channel selection instruction accepted from the providing user A49 can be permitted, and delivers channel selection information to the channel selection control unit 8 when view permission is obtained i.e. when the channel selection instruction is permitted. The channel selection control unit 8 controls the tuner unit 2 based on the channel selection information delivered from the view request control unit 21. Reference numeral 25 designates a channel selection input unit that accepts an channel selection input, which is made by the providing user A49 so as to view television program of a selected channel, via an operation panel, not shown, or a remote control, not shown.

Next, a flow of a channel selection/setting process executed by the viewing terminal 42 will be described with reference to FIG. 5.

Figure 5:
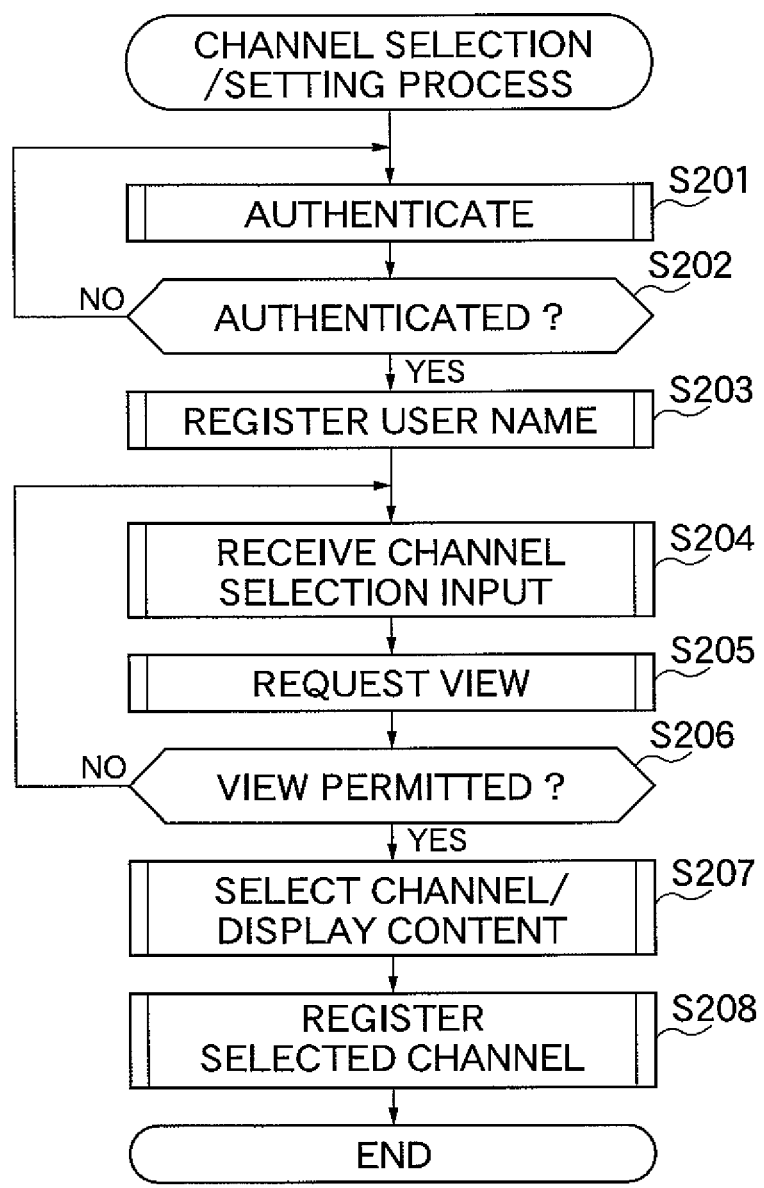
FIG. 5 is a flowchart of a channel selection/setting process executed by the viewing terminal of the viewing information-providing system.

FIG. 5 is a flowchart showing the channel selection/setting process executed by the viewing terminal 42. The present process is executed by the CPU module 23 based on a program read out e.g. from the memory 23M.

In FIG. 5, when the providing user A49 views a content (e.g. a television program), first, personal authentication of the providing user A49 is performed (step S201). Here, the viewer-detecting unit 22 performs the personal authentication based on entered authentication information, such as a password. Then, in a step S202, the view request control unit 21 determines whether or nor the result of the authentication was OK. If the result was OK, the process proceeds to a step S203, whereas if the result was not OK, the process returns to the step S201. In this case, i.e. when the providing user A49 cannot be authenticated, a message to this effect is notified to the providing user A49.

In the step S203, the view request control unit 21 registers the user name of the authenticated providing user A49 in the view management server 41. This enables the view management server 41 to know who is viewing on the viewing terminal 42.

Then, in a step S204, the view request control unit 21 accepts a channel selection input, which was made by the providing user A49 so as to view television programs of a selected channel, from the channel selection input unit 25 via the operation panel, not shown, or the remote control, not shown. Subsequently, in a step S205, the view request control unit 21 inquires of the view management server 41 whether or not the providing user A49 has the right to view the television programs of the selected channel, as a view request. Then, in a step S206, the view request control unit 21 determines whether or not view permission was received from the view management server 41, and if the view permission was received, the process proceeds to a step S207, whereas if the view permission was not received, the process returns to the step S204. When the view permission was not received, that is, when the providing user A49 does not have the right, a message to this effect is notified to the providing user A49, and the providing user A49 is advised to view television programs of another channel.

In a step S207, the channel selection control unit 8 selects the desired channel by controlling the tuner unit 2 based on channel selection information received from the view request control unit 21, and receives a desired television program to start to display video images of the television program. In a step S208, the selected channel is registered in the view management server 41 in association with the user name already registered in the step S203, followed by terminating the present process.

As described above, the viewing terminal causes a providing user to be personally authenticated when the providing user views a desired content, and registers channel selection instruction accepted from the providing user as viewing information in the view management server 41. Therefore, the view management server 41 can accurately manage the user name of a providing user and a content that the providing user is currently viewing.

Next, a flow of a providing user designation process executed by the viewing terminal 36 of the provided user D will be described with reference to FIG. 6.

Figure 6:
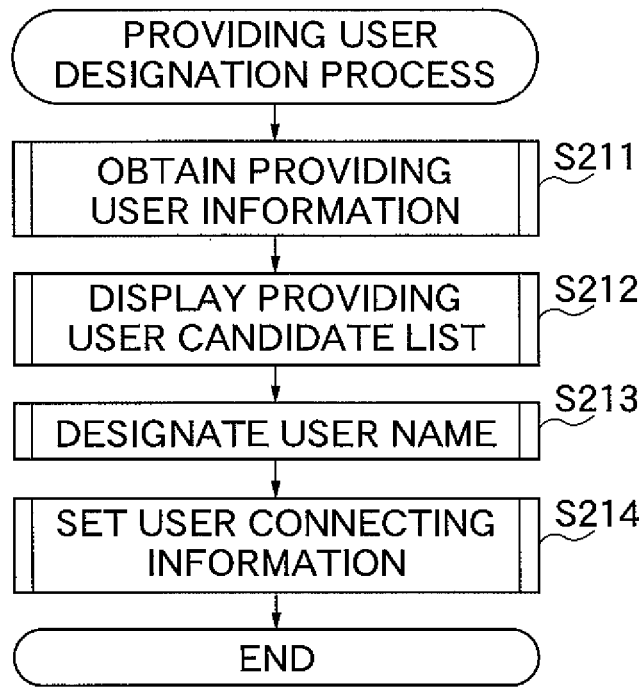
FIG. 6 is a flowchart of a providing user designation process executed by the viewing terminal of the viewing system.

FIG. 6 is a flowchart showing the providing user designation process executed by the viewing terminal 36. The present process is executed by the CPU module 6 based on a program read out e.g. from the memory 6M.

It should be noted that when the provided user D desires to perform selection of a channel in a manner following one of the providing users A to C, the provided user D designates the user name of the one of the providing users A to C, on the viewing terminal 36. The viewing terminal 36 sets designated user name of the one providing user and connection information of the view management server 41 associated with the user name.

More specifically, in FIG. 6, in a step S211, the CPU module 6 obtains providing user information. The providing user information is comprised e.g. of the user names of providing users, and connecting information registered in the view management server 41 in association with the user names. In the present embodiment, the providing user information is manually input to the viewing terminal 36 in advance for storage, and is obtained by read out the stored providing user information. The providing user information may be obtained by downloading the same from a predetermined server in which it is stored, or searching for the same by a search engine to form the results of the search into a list.

In a step S212, the CPU module 6 displays a providing user candidate list on the display unit 4 based on the obtained providing user information. In a step S213, the CPU module 6 causes the providing user designation unit 7 to designate a desired user name from the displayed providing user candidate list. In a step S214, connecting information of the designated providing user registered in the view management server 41 is set, followed by terminating the present process. In the present embodiment, viewing information on a television program that one of the providing users is currently viewing is obtained from the view management server 41 using the thus set connection information.

In the present embodiment, the providing users A to C are general users in acquaintance relationships with the provided user D. In this case, the number of the providing users is approximately several tens at most. Therefore, users may teach providing user information to each other, or my exchange data thereof by using devices, such as cellular phones. Further, it is also possible to set a celebrity to a providing user, and an unspecified number of users to provided users. When the number of providing users is too large to exchange providing user information between the users, pieces of providing user information may be made open to the public e.g. on respective home pages, or may be collectively made open to the public on a server other than the home pages.

The providing user candidate list displayed on a providing user-specifying screen in the step S212 shows the user names of the providing users (viewing information provides) for designation by selection therefrom. The provided user D selects a desired user name from the list, whereby connecting information stored in the above-described view management server of the viewing system of the providing user having the selected user name is set to the viewing terminal 36. It should be noted that the providing user-specifying screen may be configured to display not only the names of candidates but also attributes, such as hobbies and preferences, of the candidates.

Next, a flow of an automatic channel selection control process executed by the viewing terminal 36 will be described with reference to FIG. 7. The automatic channel selection control process inquires what television program a providing user is viewing when a television program that the provided user D has been viewing ends, and switches channels according to the result of the inquiry.

Figure 7:
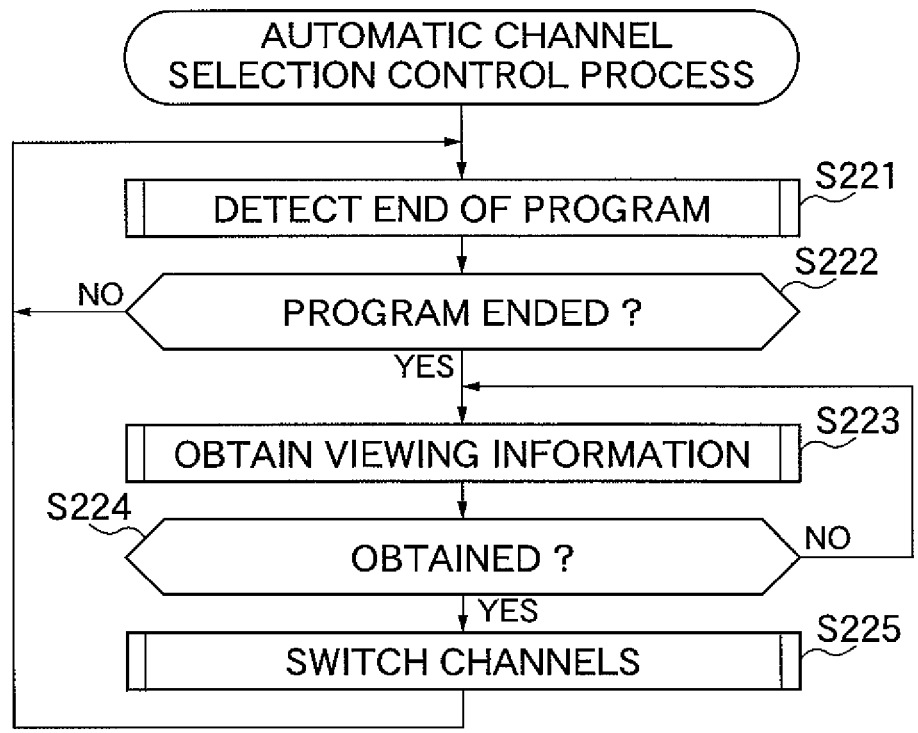
FIG. 7 is a flowchart of an automatic channel selection control process executed by the viewing terminal of the viewing system.

FIG. 7 is a flowchart showing the automatic channel selection control process executed by the viewing terminal 36. The present process is executed by the CPU module 6 based on a program read out e.g. from the memory 6M.

In FIG. 7, first, in a step S221, the channel selection control unit 8 checks the status of a content (television program in the illustrated example) being output from the tuner unit 2, for detection of the end of the television program. The detection is performed by analyzing data broadcast distributed together with the content.

In a step S222, the viewing information-obtaining unit 9 determines based on the result of the detection by the channel selection control unit 8 whether or not the television program has ended. If the television program has ended, the process proceeds to a step S223, whereas if the television program has not ended, the process returns to the step S221. In the step S223, the viewing information-obtaining unit 9 obtains viewing information of a television program that the providing user designated in the step S213 is currently viewing. In this case, the viewing information-obtaining unit 9 connects the viewing terminal 36 to the view management server 41 via the network 37, using the connecting information set in the step S214 in FIG. 6, and requests the view management server 41 to provide viewing information of the providing user. Upon reception of viewing information from the view management server 41, the process proceeds to the next step S224.

In the step S224, the viewing information-obtaining unit 9 determines whether or not the viewing information could be obtained. If the view management could be obtained, the process proceeds to a step S225, whereas if the view management could not be obtained, the process returns to the step S223. When the viewing information-obtaining unit 9 could not be connected to the view management server 41, the viewing information-obtaining unit 9 tries connection to the view management server 41, again. In the step S225, the viewing information-obtaining unit 9 transmits an instruction to the channel selection control unit 8 based on the obtained viewing information, and after the channel selection control unit 8 switches channels, the process returns to the step S221.

As described above, the viewing terminal 36 of the provided user D obtains the viewing information of the providing user A49 registered in the view management server 41, whereby it is possible to switch channels according to the obtained viewing information.

According to the above-described first embodiment, view management servers of respective viewing information-providing systems register viewing information of television programs which are currently being viewed by respective providing users using the viewing information-providing systems. A viewing terminal used by a provided user causes the provided user to select a desired providing user from the displayed providing user candidate list. When the program the provided user is viewing ends, the viewing terminal obtains viewing information of the selected providing user from the view management server of the viewing information-providing system of the selected providing user and switches channels based on the obtained viewing information. This enables the user to continue to view desired contents without performing any operation for searching for a content that the user would like to view, or for switching to or selecting another content. Further, it is possible to dispense with an operation for selecting a content which has been conventionally required at the end of a content being viewed, and hence user operability can be improved.

Although in the above-described first embodiment, personal authentication is performed on a viewing terminal on the providing user side, this is not limitative, but personal authentication may be performed on viewing terminals on the provided user side so as to permit only the authenticated provided users to view contents. Further, the view management server may be configured to provide viewing information to the authenticated provided users alone.

Further, the present viewing system may be configured such that a plurality of desired providing users can be designated from the providing user candidate list and channels can be switched as required. Further, if viewing information of one providing user selected for viewing could not be obtained, the providing user may be switched to another providing user.

Although in the above-described first embodiment, viewing information is obtained from the viewing terminal of the provided user, this is not limitative, but viewing information may be obtained from a viewing terminal on the providing user side. When a providing user has switched channels, a notification to this effect may be sent from the viewing terminal of the providing user to the viewing terminal of the provided user, whereby the viewing terminal of the provided user may switch channels in response to the notification.

Further, depending on a region, the same broadcast station has different channel numbers, or the same content is distributed by different broadcast stations. To cope with such an inconvenience, the present viewing system may be configured such that supplemental information, such as a program title, is added to viewing information of a television program, and the channel selection control unit 8 is caused to search for the television program or set the same using the supplemental information.

A second embodiment of the present invention has the same configuration as that of the above-described first embodiment (see FIG. 1), and hence description thereof is omitted. Hereinafter, only different points of the second embodiment from those of the first embodiment will be described.

Now, an example of the configuration of a viewing terminal 94 of a viewing system according to the second embodiment of the present invention used by a provided user D of the same will be described with reference to FIG. 8.

Figure 8:
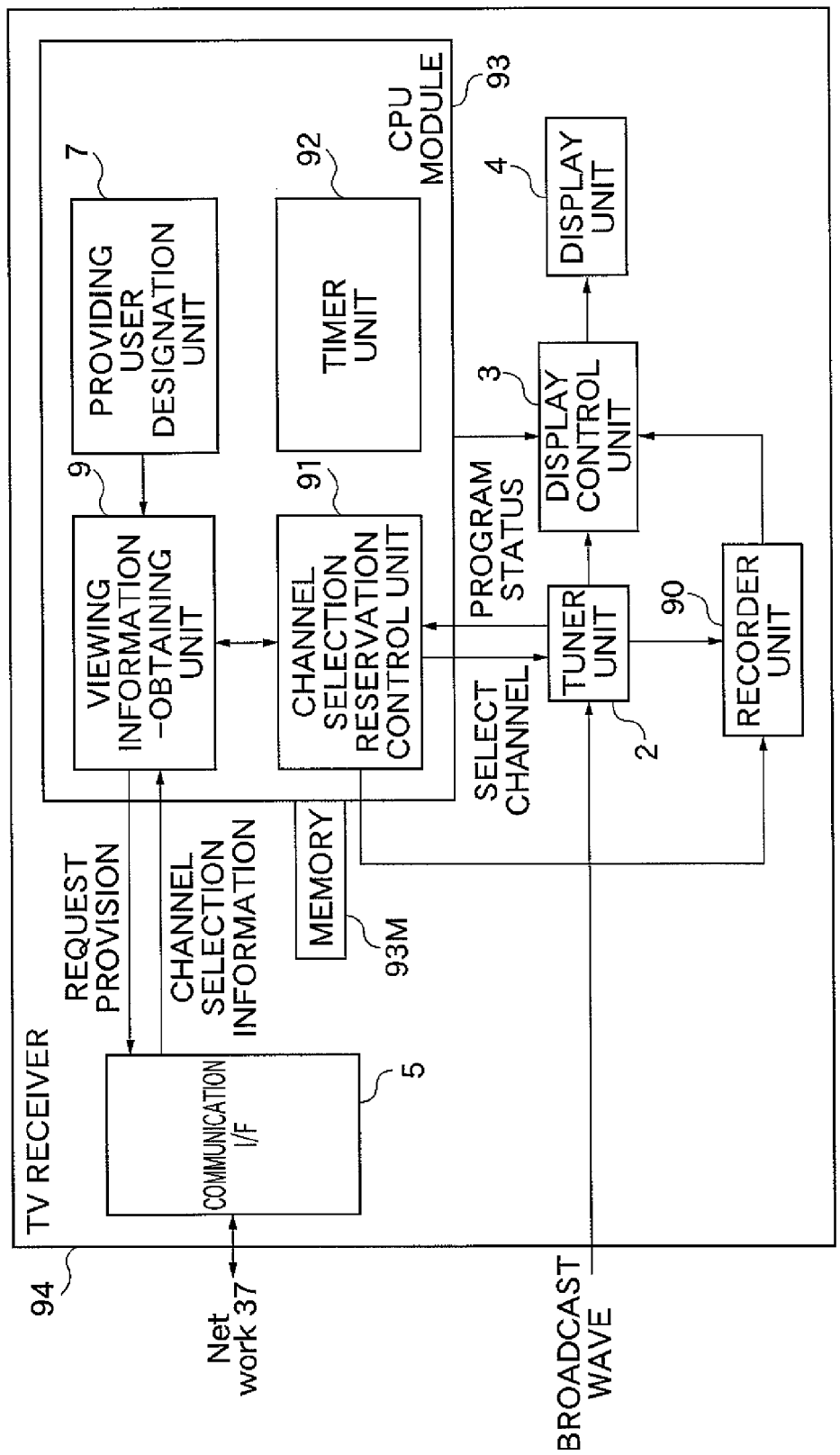
FIG. 8 is a block diagram of an example of a television receiver as an example of a viewing terminal of a viewing system according to a second embodiment of the present invention.

FIG. 8 is a block diagram of a television receiver as an example of the viewing terminal 94 of the viewing system according to the second embodiment.

In FIG. 8, the viewing terminal 94 is formed by a television receiver which receives television broadcast, as broadcast contents, from broadcast stations, for displaying television programs, and incorporates a recorder capable of recording and reproducing television programs. It should be noted that in FIG. 8, component elements identical to those of the FIG. 2 viewing terminal 36 of the viewing system according to the first embodiment are designated by identical reference numerals.

Reference numeral 2 designates the tuner unit, reference numeral 3 the display control unit, reference numeral 4 the display unit, and reference numeral 5 the communication interface. Reference numeral 93 designates a CPU module, which is comprised of a CPU, not shown, a memory 93M, and various control modules and interfaces, none of which are shown, and is connected to the tuner unit 2, the display control unit 3, the communication interface 5, and a recorder unit 90.

The CPU module 93 is comprised of the providing user designation unit 7, the viewing information-obtaining unit 9, a channel selection reservation control unit 91 for controlling the tuner unit 2 and the recorder unit 90, and a timer unit 92 for detecting time, and performs various operations for controlling the inside of the viewing terminal by executing control programs stored e.g. in the memory 93M. In viewing broadcast, the channel selection reservation control unit 91 switches to a channel according to viewing information of a providing user or a channel instructed by the provided user. Further, when reception of a television program has been reserved, the channel selection reservation control unit 91 controls the tuner unit 2 based on time counted by the timer unit 92 to thereby cause the tuner unit 2 to display a received television program. Further, when recording of a television program has been reserved, the channel selection reservation control unit 91 causes the tuner unit 2 and the recorder unit 90 to operate, based on time counted by the timer unit 92, whereby the television program is recorded. Further, when reproduction of a video content, such as a recorded television program or a movie has been reserved, the channel selection reservation control unit 91 causes the tuner unit 2 and the recorder unit 90 to operate based on time counted by the timer unit 92, whereby the video content is reproduced and displayed. By the reservation of reproduction, a television program recorded by reservation of recording is reproduced from a reserved time.

The recorder unit 90 is controlled by the channel selection reservation control unit 91, and performs recording of video contents output from the tuner unit 2, and reproduction of the recorded video contents. Recording media on which video contents are recordable by the recorder unit 90 include a DVD, an HDD, a semiconductor memory, a magnetic tape, and so forth, but are not limited to these.

Next, the configuration of a viewing terminal 100 used by a providing user will be described with reference to FIG. 9.

Figure 9:
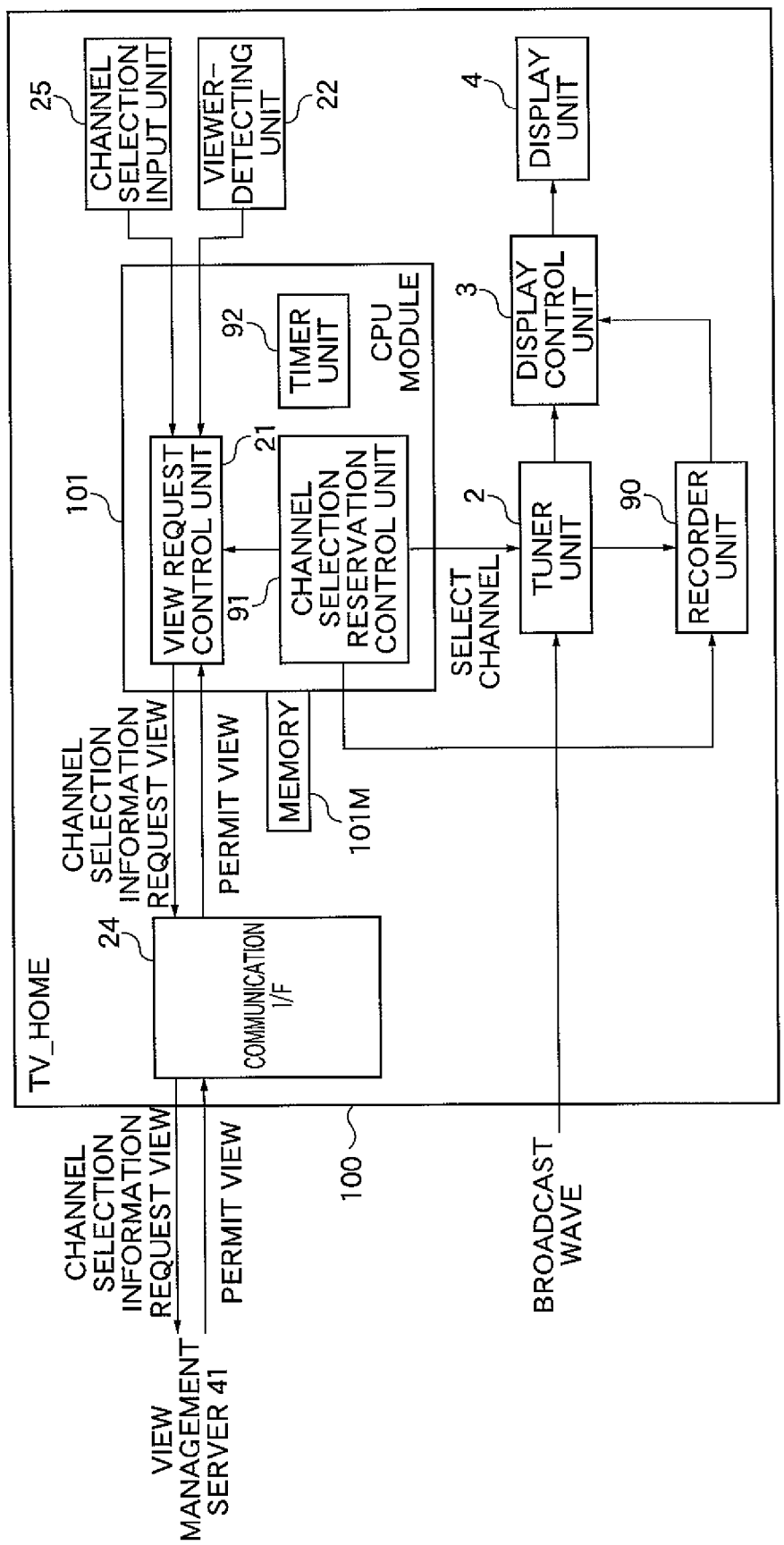
FIG. 9 is a block diagram of an example of a television receiver incorporating a recorder, as one example of a viewing terminal of a viewing information-providing system of the viewing system according to the second embodiment.

FIG. 9 is a block diagram of a television receiver incorporating a recorder, as an example of the viewing terminal 100 used by the providing user. It should be noted that in FIG. 9, component elements identical to those of the FIG. 4 viewing terminal 42 of the viewing system according to the first embodiment, and those of the FIG. 8 viewing terminal 94 are designated by identical reference numerals.

In FIG. 9, reference numeral 2 designates the tuner unit, reference numeral 3 the display control unit, reference numeral 4 the display unit, reference numeral 24 the communication interface, and reference numeral 90 the recorder unit. Further, reference numeral 22 designates the viewer-detecting unit, reference numeral 21 the view request control unit, and reference numeral 25 the channel selection input unit.

Reference numeral 101 designates a CPU module, which is comprised of a CPU, not shown, a memory 101M, and various control modules and interfaces, none of which are shown, and is connected to the tuner unit 2, the communication interface 24, and the recorder unit 90. The CPU module 101 performs various operations for controlling the inside of the viewing terminal 100 by executing control programs stored e.g. in the memory 101M.

The CPU module 101 is comprised of the view request control unit 21, the channel selection reservation control unit 91, and the timer unit 92. Upon accepting a view reservation from the providing user, the channel selection reservation control unit 91 registers details of the view reservation (e.g. a start time and an end time of a program, a source, a channel, a title, and so forth) in the view management server 41 as well. The view management server 41 forms a view reservation list based on the registered details of the reservation, and provides the view reservation list as viewing information in response to a request from the viewing terminal of the provided user. It should be noted that similarly to the viewing terminal 42 of the viewing system according to the first embodiment, the viewing terminal 100 permits the providing user to view a television program after performing personal authentication of the providing user.

The view reservation list includes reservation numbers sequentially assigned to respective reservation items in the order of start times of television programs, respective start times and end times of reserved operations, kinds of the reserved operations (e.g. "receptions", "recording", and "reproduction"), sources (e.g. tuner devices, such as "BSTV" and "CATV", and video recording and reproducing devices, such as "Recorder") on which the reserved operations are performed, channels from which programs are received or recorded, and titles of contents. It should be noted that details of a reservation are not limited to these, but the view management server may be configured to be capable of storing other information items. For example, the view management server may be configured to be capable of performing reservation such that "history-associated" contents can be mainly viewed. It should be noted that the view reservation list is not limited to be in a tabular format, but it may be in a data format.

Next, a flow of an automatic reservation control process executed by the viewing terminal 94 on the provided user side will be described with reference to FIG. 10.

Figure 10:
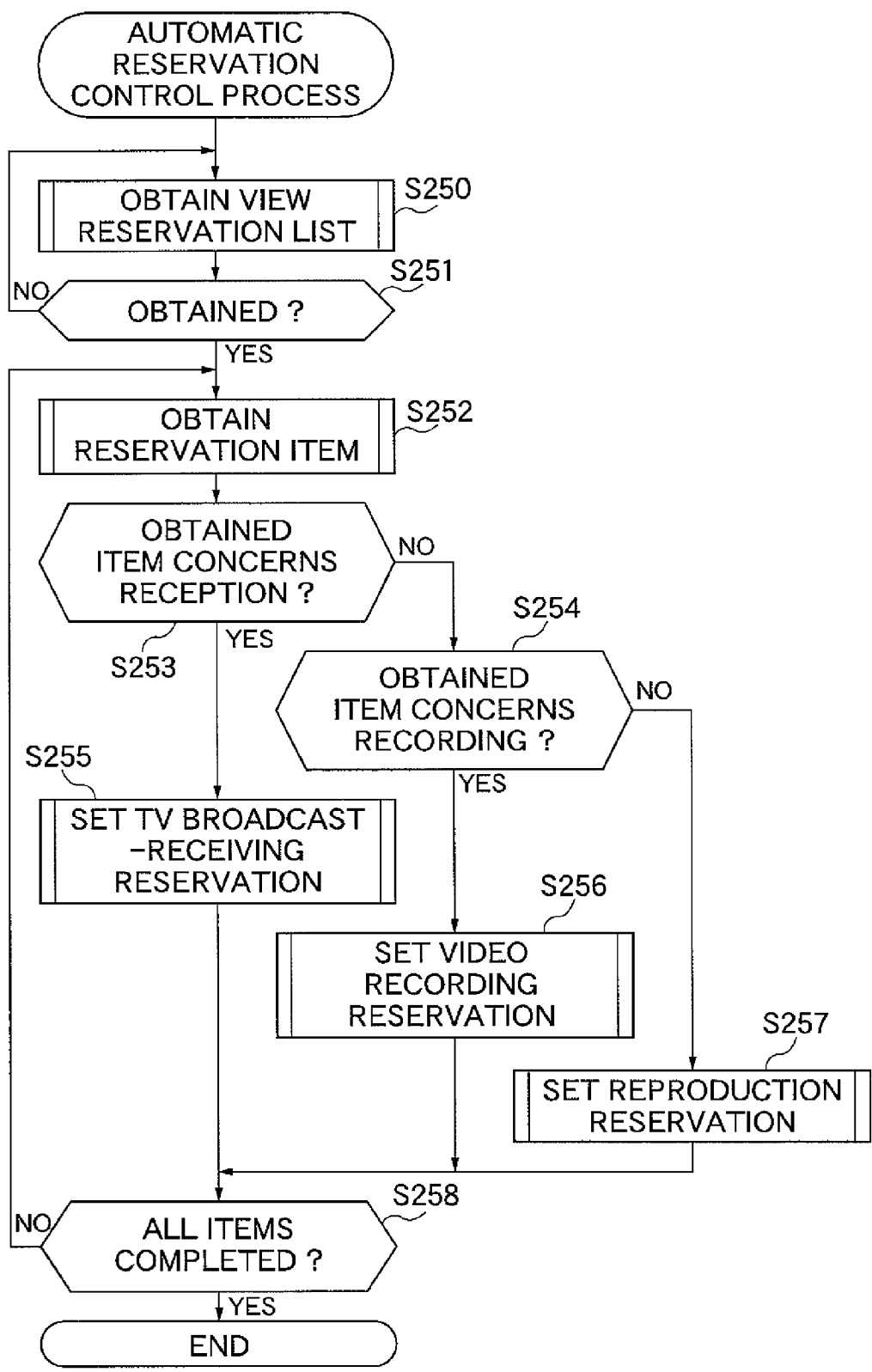
FIG. 10 is a flowchart of an automatic reservation control process executed by the viewing terminal of the viewing system according to the second embodiment.

FIG. 10 is a flowchart of the automatic reservation control process executed by the viewing terminal 94.

The viewing terminal 94 obtains reservation information of the providing user, and carries out the automatic reservation control process during reserved time periods. On the other hand, during unreserved time periods, the viewing terminal 94 obtains viewing information concerning a content that the providing user is viewing, and operates such that the provided user can view the same content as the content that the providing user is viewing.

Referring to FIG. 10, in a step S250, the viewing terminal 94 obtains the view reservation list of the providing user. In this case, the viewing terminal 94 is connected to the view management server 41 via the network 37, to request and obtain the view reservation list of the providing user.

Then, in a step S251, the viewing terminal 94 determines whether or not the view reservation list could be obtained. If it could be obtained, the process proceeds to a step S252, whereas if it could not be obtained, the process returns to the step S250. It should be noted that if the view reservation list could not be obtained, error handling, such as a retry or switching providing users, may be additionally performed, as required.

Subsequently, in a step S252, the viewing terminal 94 sequentially obtains reservation items from the view reservation list. Then, in a step S253, the viewing terminal 94 determines whether or not details of an obtained reservation item concern a receiving operation. If the details concern the receiving operation, the process proceeds to a step S255, whereas if the details do not concern the receiving operation, the process proceeds to a step S254.

In the step S254, the viewing terminal 94 determines whether or not the details of the obtained reservation item concerns a recording operation. If the details concern the recording operation, the process proceeds to a step S256, whereas if the details do not concern the recording operation, the process proceeds to a step S257.

In the step S255, the viewing terminal 94 sets reservation of reception of a television broadcast, whereafter the process proceeds to a step S258. In the step S256, the viewing terminal 94 sets reservation of recording by the recorder 90, and the process proceeds to the step S258. In the step S257, the viewing terminal 94 sets reservation of reproduction by the recorder 90 and reservation for display by the display unit 4, whereafter the process proceeds to the step S258.

In the step S258, the viewing terminal 94 determines whether or not processing of all the reservation items of the view reservation list has been terminated. If it is determined in the step S258 that the processing has not been terminated, the process returns to the step S252, wherein processing is carried out again on the next reservation item of the view reservation list, whereas if the processing of all the reservation items has been terminated, the present process is terminated. It should be noted that during the unreserved time periods, it is only required to carry out the control process described hereinabove as to the first embodiment.

According to the above-described second embodiment, the viewing terminal of the provided user obtains a view reservation list accepted from the providing user, from the view management server, and executes the automatic reservation control process during reserved time periods. On the other hand, during unreserved time periods, similarly to the above-described first embodiment, the viewing terminal obtains viewing information (containing program information) concerning a content being viewed by the providing user, and operates such that the provided user can view the same content as the content that the providing user is viewing. By performing the present process, the viewing terminal obtains reservation information of the providing user and the program information being viewed by the providing user, and performs a reserving operation based on the reservation information during each reserved time period. On the other hand, during each unreserved time period, the viewing terminal is capable of switching to the same content as the providing user is viewing. Thus, similarly to the above-described first embodiment, the user can continue to view desired contents without performing any operation for searching for a content that the user would like to view, or for switching to or selecting another content. Further, it is possible to dispense with an operation for reserve recording of contents, and expand the range of time during which the viewing terminal of the provided user can be controlled in a manner following the viewing terminal of the providing user. This makes it possible to further enhance operability.

Although in the above-described second embodiment, the description is given of the case in which the recorder unit is incorporated in the viewing terminal, the viewing terminal may be configured to be connected to an external video recording device. In this case, the viewing terminal and the video recording device are connected to each other by a network, an IEEE1394, a USB, or the like, but the method of the connection is not limited to these.

Although in the above-described second embodiment, the description is given of the view reservation list which is set such that the providing user himself views contents, this is not limitative, but the view reservation list may be replaced by a list of television programs recommended to the provided user.

When a content reserved for viewing and a content instructed by the providing user or the provided user conflict with each other, a message to this effect may be notified to the providing user or the provided user.

An advertising business model may be constructed for providing viewing information of providing users to advertising companies. Advertising companies are made capable of providing viewing information of the providing users including their status of viewing commercials to provided users, thereby enabling the provided users to view broadcast contents including commercials of the advertising companies in a manner following the providing users. The viewing information is also provided to the advertising companies, and incentives are given to the providing users according to their viewing information-providing performance of commercials. This not only enables the provided users to obtain the same advantageous effects as provided by the above-described embodiment, and but also enables the advertising companies to improve the degree of achievement of commercials.

The present invention is by no means limited to the above-described first and second embodiments, but it can be widely applied.

It is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

In these cases, the program code is supplied from a storage medium in which the program code is stored, or is supplied by downloading directly from another computer, a database, or the like, not shown, connected to the Internet, a commercial network, a local area network, or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-163863 filed Jun. 13, 2006, which is hereby incorporated by reference herein in its entirety.

What is claimed is:

1. A content processing apparatus, comprising:
a store control unit configured to store a plurality of user IDs and connection information of a plurality of management devices, wherein the plurality of user IDs correspond to the connection information of the plurality of management devices;
a display control unit configured to display the plurality of user IDs stored by the store control unit;
a user designation unit configured to designate a user ID from the plurality of user IDs displayed by the display control unit;
a processing unit configured to reproduce content;
a content designation unit configured to designate content to be reproduced by the processing unit;
an acquiring unit configured to acquire from a first management device of the plurality of management devices, in accordance with a termination of reproducing of a first content, which is designated by the content designation unit and is reproduced by the processing unit, identification information on a second content provided to a first device corresponding to the designated user ID designated by the user designation unit, wherein the acquiring unit connects to the first management device by using the connection information corresponding to the designated user ID designated by the user designation unit to acquire the identification information on the second content from the first management device; and
a control unit configured to control the processing unit to reproduce the first content other than the second content which is provided to the first device corresponding to the designated user ID designated by the user designation unit until the termination of the reproducing of the first content designated by the content designation unit, and to reproduce the second content provided to the first device corresponding to the designated user ID in accordance with the termination of the reproducing of the first content reproduced by the processing unit,
wherein the acquiring unit acquires, from the first management device corresponding to the designated user ID, identification information on a third content in a case where a first state in which the second content provided to the first device corresponding to the designated user ID is reproduced by the processing unit is changed to a second state in which the third content is reproduced to a second device corresponding to the designated user ID designated by the user designation unit, and
wherein the control unit changes a reproduced content from the second content to the third content in accordance with the acquiring of the identification information on the third content.

2. The apparatus according to claim 1, wherein the first content is a content of which recording is reserved by a user of the content processing apparatus, and the control unit is configured to control the processing unit to reproduce the second content in accordance with the termination of the recording reserved time period of the first content.

3. The apparatus according to claim 1, wherein the display control unit displays the plurality of user IDs with attribute information related to preferences of users corresponding to the user IDs.

4. The apparatus according to claim 1, wherein the acquiring unit acquires identification information on a fourth content provided to the second device corresponding to the designated user ID designated by the user designation unit, in accordance with a termination of reproducing of the third content, without a designation of a user ID after starting of the reproducing of the third content, and the control unit controls to reproduce the fourth content based on the identification information on the fourth content.

5. A content processing method executed by a content processing apparatus, comprising:
a store control step of storing a plurality of user IDs and connection information of a plurality of management devices, wherein the plurality of user IDs correspond to the connection information of the plurality of management devices;
a display control step of displaying the plurality of user IDs stored in the store control step;
a user designation step of designating a user ID from the plurality of user IDs displayed in the display control step;
a first reproduction step of reproducing a first content;
a content designation step of designating content to be reproduced in the first reproduction step;
a first acquiring step of acquiring from a first management device of the plurality of management devices, in accordance with a termination of reproducing of the first content, which is designated in the content designation step and is reproduced in the first reproduction step, identification information on a second content provided to a first device corresponding to the designated user ID designated in the user designation step, wherein the acquiring step includes connecting to the first management device by using the connection information corresponding to the designated user ID designated in the user designation step to acquire the identification information on the second content from the first management device;
a second reproduction step of reproducing the second content provided to the first device corresponding to the designated user ID in accordance with the termination of the reproducing of the first content reproduced in the first reproduction step,
wherein the first reproduction step reproduces the first content other than the second content which is provided to the first device corresponding to the designated user ID designated in the user designation step until the termination of the reproducing of the first content designated in the content designation step;
a second acquiring step of acquiring, from the first management device corresponding to the designated ID, identification information on a third content in a case where a first state in which the second content is reproduced at the first device corresponding to the designated user ID is changed to a second state in which the third content is reproduced at a second device corresponding to the designated user ID designated in the user designation step; and a change step of changing a reproduced content from the second content to the third content in accordance with the acquiring of the identification information on the third content.

6. The method according to claim 5, wherein the first content is a content of which recording is reserved by a user of the content processing apparatus, and the second reproduction step reproduces the second content in accordance with the termination of the recording reserved time period of the first content.

7. The method according to claim 5, wherein the display control step displays the plurality of user IDs with attribute information related to preferences of users corresponding to the user IDs.

8. The method according to claim 5, further comprising:
a third acquiring step of acquiring identification information on a fourth content provided to the first device corresponding to the designated user ID designated in the user designation step, in accordance with a termination of reproducing of the third content, without a designation of a user ID after starting of the reproducing of the third content, and
a third reproduction step of reproducing the fourth content based on the identification information on the fourth content.

9. A non-transitory storage medium in which a program for causing a computer to execute a content processing method is stored, wherein the method comprises:
a store control step of storing a plurality of user IDs and connection information of a plurality of management devices, wherein the plurality of user IDs correspond to the connection information of the plurality of management devices;
a display control step of displaying the plurality of user IDs stored in the store control step;
a user designation step of designating a user ID from the plurality of user IDs displayed in the display control step;
a first reproduction step of reproducing a first content;
a content designation step of designating content to be reproduced in the first reproduction step;
a first acquiring step of acquiring from a first management device of the plurality of management devices, in accordance with a termination of reproducing of the first content, which is designated in the content designation step and is reproduced in the first reproduction step, identification information on a second content provided to a first device corresponding to the designated user ID designated in the user designation step, wherein the acquiring step connects to the first management device by using the connection information corresponding to the designated user ID designated in the user designation step to acquire the identification information on the second content from the first management device;
a second reproduction step of reproducing the second content provided to the first device corresponding to the designated user ID in accordance with the termination of the reproducing of the first content reproduced in the first reproduction step,
wherein the first reproduction step reproduces the first content other than the second content which is provided to the first device corresponding to the designated user ID designated in the user designation step until termination of the reproducing of the first content designated in the content designation step;
a second acquiring step of acquiring, from the first management device corresponding to the designated ID, identification information on a third content in a case where a first state in which the second content is reproduced at the first device corresponding to the designated user ID is changed to a second state in which the third content is reproduced at a second device corresponding to the designated user ID designated in the user designation step; and
a change step of changing a reproduced content from the second content to the third content in accordance with the acquiring of the identification information on the third content.

10. The non-transitory storage medium according to claim 9, wherein the first content is a content of which recording is reserved by a user of the content processing apparatus, and the second reproduction step reproduces the second content in accordance with the termination of the recording reserved time period of the first content.

11. The non-transitory storage medium according to claim 9, wherein the display control step displays the plurality of user IDs with attribute information related to preferences of users corresponding to the user IDs.

12. The non-transitory storage medium according to claim 9, wherein the method further comprises:
a third acquiring step of acquiring identification information on a fourth content provided to the first device corresponding to the designated user ID designated in the user designation step, in accordance with a termination of reproducing of the third content, without a designation of a user ID after starting of the reproducing of the third content, and
a third reproduction step of reproducing the fourth content based on the identification information on the fourth content.

\* \* \* \* \*